United States Patent [19]
Schneider

[11] Patent Number: 5,873,436
[45] Date of Patent: Feb. 23, 1999

[54] ELECTROMAGNETIC HYSTERESIS BRAKE

[75] Inventor: Rudolf Schneider, Meckenbeuren, Germany

[73] Assignee: ZF Friedrichshafen AG, Friedrichshafen, Germany

[21] Appl. No.: 776,002

[22] PCT Filed: Jul. 7, 1995

[86] PCT No.: PCT/EP95/02633

§ 371 Date: Jan. 10, 1997

§ 102(e) Date: Jan. 10, 1997

[87] PCT Pub. No.: WO96/01779

PCT Pub. Date: Jan. 25, 1996

[30] Foreign Application Priority Data

Jul. 12, 1994 [DE] Germany ............ 44 24 457.6

[51] Int. Cl.$^6$ ........................................ B60L 7/00
[52] U.S. Cl. ................................ 188/158; 188/163
[58] Field of Search .......................... 188/158, 161, 188/163, 267, 71.7, 72.3; 310/77, 93, 103, 108

[56] References Cited

U.S. PATENT DOCUMENTS

| 3,626,220 | 12/1971 | Niculescu | 188/163 X |
|---|---|---|---|
| 4,216,849 | 8/1980 | Neill | 188/163 X |
| 4,235,311 | 11/1980 | Brinkmann et al. | 188/163 X |
| 4,337,855 | 7/1982 | Bennett | 188/163 X |
| 4,515,251 | 5/1985 | Wruk | 188/171 |
| 4,679,745 | 7/1987 | Kim | 188/163 X |
| 4,982,825 | 1/1991 | Sekella | 188/161 X |
| 5,497,860 | 3/1996 | Hendricks | 188/161 X |

FOREIGN PATENT DOCUMENTS

| 37 32 766 A1 | 4/1988 | Germany . |
|---|---|---|
| 38 28 110 A1 | 2/1990 | Germany . |

OTHER PUBLICATIONS

Antriebstechnik, vol. 24, No. 6, 1985 Mainz De, pp. 42–44; "Exakte Zugkraftregelung durch HystereseKupplungen unde–Bremsen", see p. 42; figure 2B.

Primary Examiner—Robert J. Oberleitner
Assistant Examiner—Pamela J. Lipka
Attorney, Agent, or Firm—Davis and Bujold

[57] ABSTRACT

An electromagnetic hysteresis brake is provided with a two-part pole ring with an inner and an outer pole ring part (5, 6) and a field coil (10) and further provided with a rotating ring (3) made of a permanent-magnetic material, the ring (3) projects into an annular air gap (11) of the pole ring which is formed between the inner and the outer pole ring parts (5, 6), at least one of the air gaps (12) of the brake is adjustable.

8 Claims, 2 Drawing Sheets

ELECTROMAGNETIC HYSTERESIS BRAKE

The invention concerns an electromagnetic hysteresis brake of the kind defined in detail in the preamble of claim 1.

A hysteresis brake of this kind has been disclosed in the ZF-Katalog "Hysteresis Clutches and Brakes" KB 2.

Electromagnetic hysteresis brakes have been used, for example, in textile machines as so-called thread brakes. The typical feature of such machines is a plurality of production units which are arranged in series and have comparatively the same process cycle.

The individual thread brakes are centrally controlled electrically. This means that the torque, for an optimal process cycle, is adjusted via current. But all brakes must here have precisely the same torque with the same current. One problem is, however, that deviations in the width and size of an air gap of the brake, particularly the annular air gap, which inevitably results from manufacturing tolerances that are so great that all brakes used in a machine must be adjusted to a uniform torque or be calibrated. This results in a considerable expenditure in cost and time.

Therefore, the problem on which the invention is based is to provide an electromagnetic hysteresis brake of the above mentioned kind, in which it is possible to obtain an adjustment in relation to a uniform torque by means of simple steps.

According to the invention, this problem is solved by the steps mentioned in the characteristic part of claim 1.

In solving said problem, the inventor takes as a point of departure the knowledge that the size of the air gap reflects upon the characteristic line of the path of the torque. The larger the air gap is, for example, the smaller the torque becomes.

However, as already mentioned, air gaps of different sizes cannot be avoided.

By the fact that an adjustable air gap has now been "artificially" provided, it is finally possible by adequately changing said adjustable air gap to obtain that the sum of all the air gaps of a hysteresis brake are kept equal, it is thereby possible to provide a precisely defined or preselected torque for a hysteresis brake.

For this purpose, it is only required that after producing a hysteresis brake of the above mentioned kind, a calibrating current is adjusted and then that the adjusted air gap is changed from a minimum to a maximum until reaching the desired torque.

In a simple manner, an air gap will be adjustably designed between the inner and outer pole ring parts for which specially recommends itself the air gap between the outer pole ring part, which cup-like comprises the inner pole ring part, and a front side of the inner pole ring part.

For a precise adjustment of the air gap, the gap size will be advantageously designed wedge shaped that becomes larger toward the axis of rotation.

The wedge shape between the inner and outer pole ring parts can be produced in different manners.

It is thus possible, for example, to situate in this place between both pole ring parts a disc designed in the shape of a cup spring which is elastically deformable and by means of which the space or air gap between the inner and outer pole ring parts is adjusted in this manner.

Alternatively to this, either the outer pole ring part can have a wedge shape, on the side coordinated with the inner pole ring part, in which case the outer pole ring part must be elastically deformable in this area or the inner pole ring part have-in reversal of that-a corresponding wedge, cup or hollow shape on the front side coordinated with the outer pole ring part.

The size of the air gap can be changed in different manners. For this purpose, a fixing bolt, for example, by means of which the air gap can be adjusted so as to adequately change the space between the inner and outer pole ring parts can be provided in a simple manner.

In a structural embodiment, it can be provided for said purpose that the back of the outer pole ring part is provided with a central hole through which the fixing bolt can be inserted and threaded in the inner pole ring part.

By intentionally leaving a residual air gap, that is, an incomplete tightening of the bolt, different annular gaps can be compensated on the poles. This means, for example, that with the same magnetic coil current the sum of the total air gap resistances, and therewith the torque, also can be unified. A simple torque adjustment is provided in this manner.

Two embodiments of the invention are described herebelow with the aid of the drawings. In the drawings.

Since the hysteresis brake is basically of a known design, only the parts essential to the invention are described in detail in combination with the embodiment.

Figure 1:
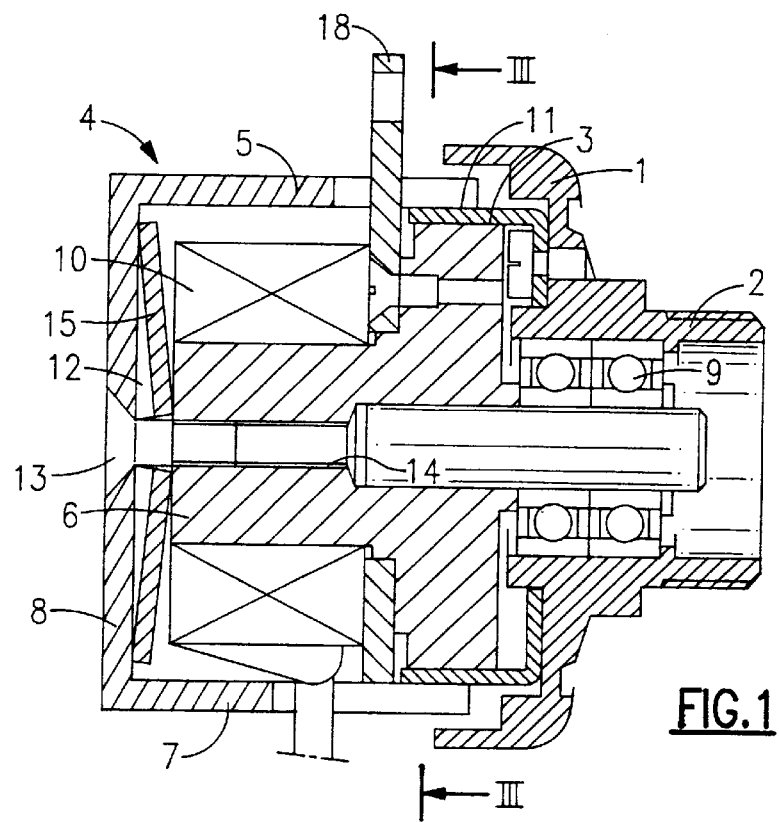
FIG. 1 is a longitudinal section through one embodiment having a disc designed in the shape of a cup spring with a maximum air gap.
Figure 2:
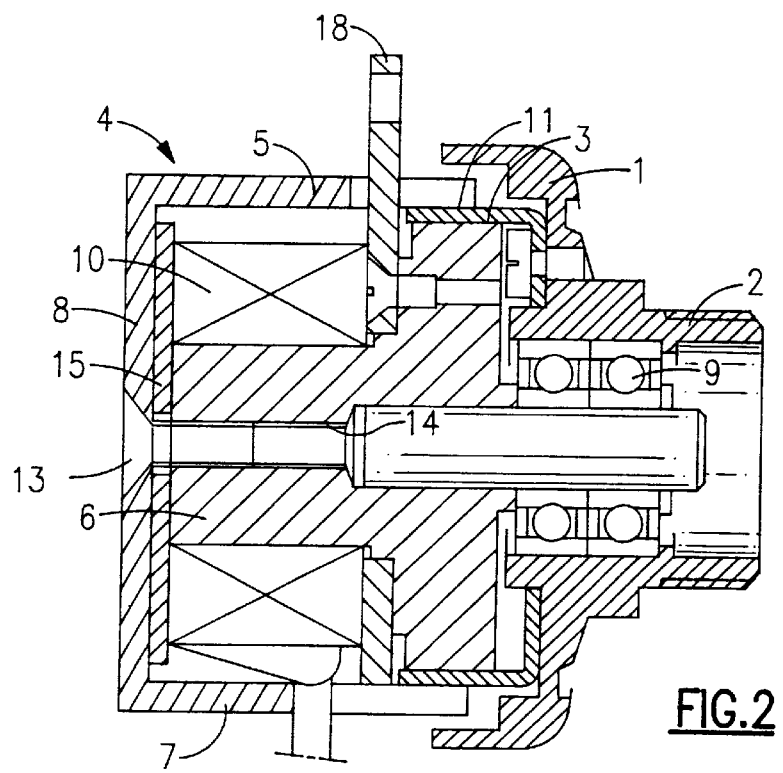
FIG. 2 is the embodiment according to FIG. 1 with a minimum air gap or with none.
Figure 3:
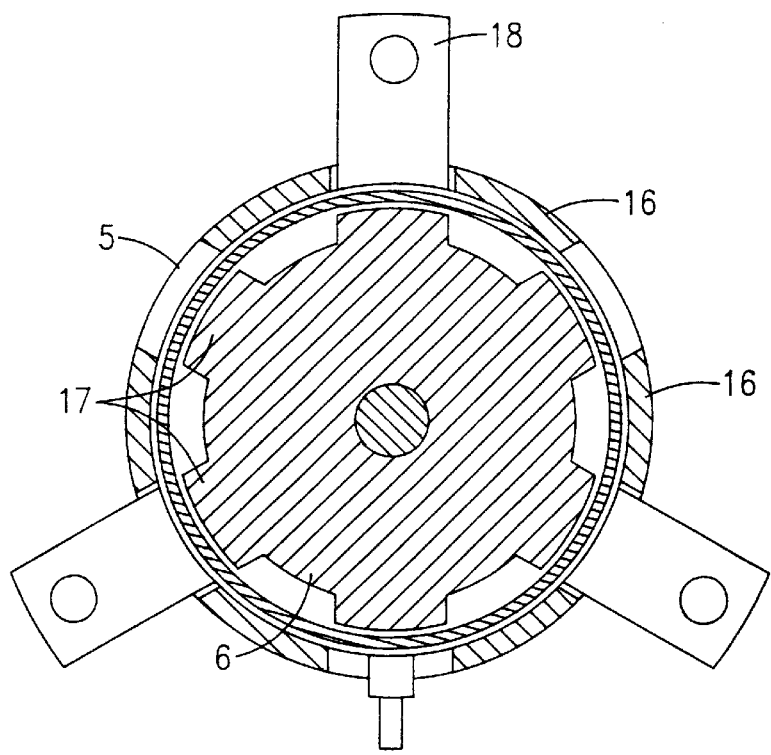
FIG. 3 is a section along line III—III of FIG. 1.

The hysteresis brake, according to the embodiment of FIGS. 1 to 3, has an armature 1 firmly fitted on a shaft 2. A hysteresis ring 3, made of permanent-magnetic material and having its axis situated coaxially in relation to the axis of the shaft 2, projects from the armature 1.

A brake magnet 4, which is stationary or fixed, has an outer pole ring part 5 and an inner pole ring part 6. The outer pole ring part 5 has a cup-like design with an annular peripheral part 7 and a cup-like back 8. The cup-like back 8 encloses, on a front side, the inner pole ring part 6 while, on the other side, the inner pole ring part is situated spaced from the armature 1. The inner pole ring part 6 is separated from the shaft 2 by ball bearings 9.

The inner pole ring part 6 is designed with different diameter steps, one field coil 10 is inserted between a recess of the inner pole ring part 6 and an inner peripheral wall of the outer pole ring part 5.

On the side facing the armature, the inner diameter of the outer pole ring part 5 and the outer diameter of the inner pole ring part 6 are such that an annular air gap 11 results where the hysteresis ring 3 can rotate.

Between the cup-like back 8 and the front side of the inner pole ring 6, lying on this side, a cup-spring shaped disc 15 is situated which, due to its shape, produces an annular air gap 12 which taperingly increases toward the rotation axis.

To produce the required torque, the poles 16 of the outer pole ring part 5 are peripherally offset, in a manner known per se, relative to the poles 17 of the inner pole ring part 6 (see FIG. 3). The connecting tabs for the brake can also be seen in this figure.

The adjustment of a desired torque is obtained by changing the size of the air gap 12.

For this purpose, the back 8 of the outer pole ring part 5 is provided with a central hole through which a fixing bolt 13 is inserted. The fixing bolt 13 projects into a bolt hole 14 of the inner pole ring part 6.

By a controlled tightening of the fixing bolt 13, the size of the air gap 12 can be correspondingly changed. By tightening the fixing bolt 13, the cup-shaped disc 15 is correspondingly deformed to a maximum until the air gap 12 is completely eliminated. This position is shown in FIG. 2.

This means that for a minimal torque adjustment the air gap width X will be made as large as possible, while for a maximum torque adjustment the air gap 12 will be set to zero. By this step it is possible to obtain easily the same torque adjustment for several hysteresis brakes independently of the manufacturing tolerances, especially in relation to the annular gap 11.

Figure 4:
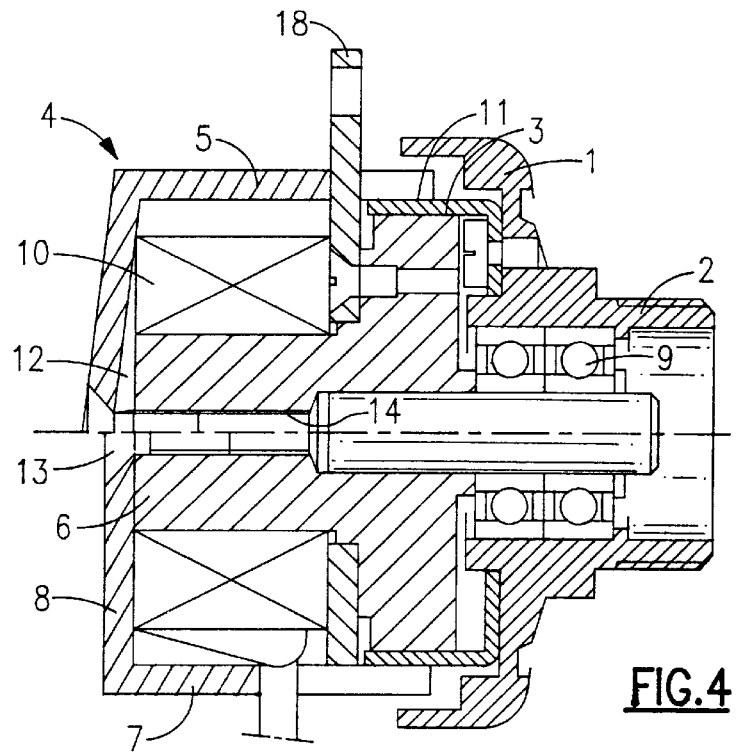
FIG. 4 is another embodiment of the invention.

In FIG. 4, an alternative design, for providing an adjustable air gap 12 between the outer pole ring part 5 and one front face of the inner pole ring part 6, is shown. This design is basically constructed in the same manner as the embodiment of FIGS. 1 to 3, for this reason the same reference numerals are used herebelow for the same parts.

Unlike the embodiment of FIGS. 1 to 3, instead of a separate disc 15, the back 8 of the outer pole ring part is designed slightly conical so that, in a direction toward the axis of rotation of the shaft 2, a gap forms which enlarges in the direction toward the axis of rotation. In this design, it is obviously required that the back 8 is designed adequately elastic so that when the fixing bolt 13 is tightened, the back 8 is accordingly deformed, in extreme cases it is possible to abut against the whole front side of the inner pole ring 6 without an air gap 12 situated therebetween. In FIG. 4, for the sake of simplicity, the position with the air gap 12 is shown in the upper half and the position without an air gap is shown in the lower half.

The same result can also be obtained if instead of this the front side of the inner pole ring part is arched inwardly or from outside inwards in the direction of the armature.

| Reference numerals |
| --- |
| 1 armature |
| 2 shaft |
| 3 hysteresis ring |
| 4 brake magnet |
| 5 outer pole ring part |
| 6 inner pole ring part |
| 7 annular peripheral part |
| 8 cup-like back |
| 9 roller bearing |
| 10 field coil |
| 11 annular gap |
| 12 gap |
| 13 fixing bolt |
| 14 threaded hole |

| -continued |
| --- |
| Reference numerals |
| 15 disc |
| 16 poles |
| 17 poles |
| 18 connecting tabs |

I claim:

1. An electromagnetic hysteresis brake having one stationary brake magnet which has one two-part pole ring with an inner pole ring part and an outer pole ring part and a field coil, having a rotating armature connected with a shaft and being provided with one hysteresis ring (3) which rotates with said armature about an axis of rotation, said ring projecting into an annular air gap (11) of said pole ring which is formed between the inner and the outer pole ring parts, and having an air gap (12) formed between a back wall (8) of said outer pole ring part (5) which is cup-like shaped and a front side of said inner pole ring part (6), wherein at least one of said air gaps of the brake is adjustable to adjust the torque of the brake.

2. A hysteresis brake according to claim 1 wherein a said air gap (12) is adjustable.

3. A hysteresis brake according to claim 2, wherein said air gap (12) has a wedge shaped cross section with a gap size which increases toward the axis of rotation.

4. A hysteresis brake according to claim 2, wherein said back wall (8) of said outer pole ring part (5) is elastic and at least partly encloses said inner pole ring part (6).

5. A hysteresis brake according to claim 2, wherein a cup-shaped elastic disc spring (15) is located between said outer pole ring part (5) and the front side of said inner pole ring part (6).

6. A hysteresis brake according to claim 5, wherein said air gap (12) is adjustable by means of at least one fixing bolt (13).

7. A hysteresis brake according to claim 6, wherein said back wall (8) of said outer pole ring part (5) is provided with a central hole through which said fixing bolt (13) is inserted and threaded into said inner pole ring part (6).

8. A hysteresis brake according to claim 1, wherein the front side of said inner pole ring part (6) is remote from said annular gap (11).

* * * * *